United States Patent [19]

Hesky et al.

[11] 4,277,256

[45] Jul. 7, 1981

[54] PROCESS FOR THE PURIFICATION OF GASES CONTAINING RADIOACTIVE SUBSTANCES

[75] Inventors: Hans Hesky, Runkel; Armin Wunderer, Hofheim am Taunus, both of Fed. Rep. of Germany

[73] Assignee: Hoechst Aktiengesellschaft, Frankfurt am Main, Fed. Rep. of Germany

[21] Appl. No.: 59,132

[22] Filed: Jul. 20, 1979

Related U.S. Application Data

[63] Continuation of Ser. No. 886,519, Mar. 14, 1978, abandoned.

[30] Foreign Application Priority Data

Mar. 16, 1977 [DE] Fed. Rep. of Germany ....... 2711374

[51] Int. Cl.³ ............................................ B01D 59/50

[52] U.S. Cl. ............................................ 55/66; 55/71; 203/42; 423/239; 423/262

[58] Field of Search ................. 55/66, 71; 203/42, 49; 423/239, 262

[56] References Cited

U.S. PATENT DOCUMENTS

| | | | |
|---|---|---|---|
| 3,404,067 | 10/1968 | Rendos | 55/66 X |
| 3,429,103 | 2/1969 | Taylor | 55/71 |
| 3,658,467 | 4/1972 | Maeck | 55/71 X |
| 3,742,720 | 7/1973 | Ferguson et al. | 55/66 X |
| 3,808,327 | 4/1974 | Roberts | 423/239 X |
| 3,838,554 | 10/1974 | Wilhelm et al. | 55/71 |
| 3,887,339 | 6/1975 | Robertson | 55/66 |
| 4,025,603 | 5/1977 | Shibata et al. | 423/239 |
| 4,080,429 | 3/1978 | Koeppe et al. | 55/66 X |

*Primary Examiner*—Robert H. Spitzer

*Attorney, Agent, or Firm*—Curtis, Morris & Safford

[57] ABSTRACT

Gases resulting from the re-processing of spent nuclear fuel contain radioactive substances which are separated by mixing the said gases with a carrier gas having approximately the same separating behavior as the radioactive substances; the gas mixture obtained is separated into a fraction containing the radioactive substances and the carrier gas and a fraction free from these components. In a further stage the radioactive substances are separated from the carrier gas.

8 Claims, 1 Drawing Figure

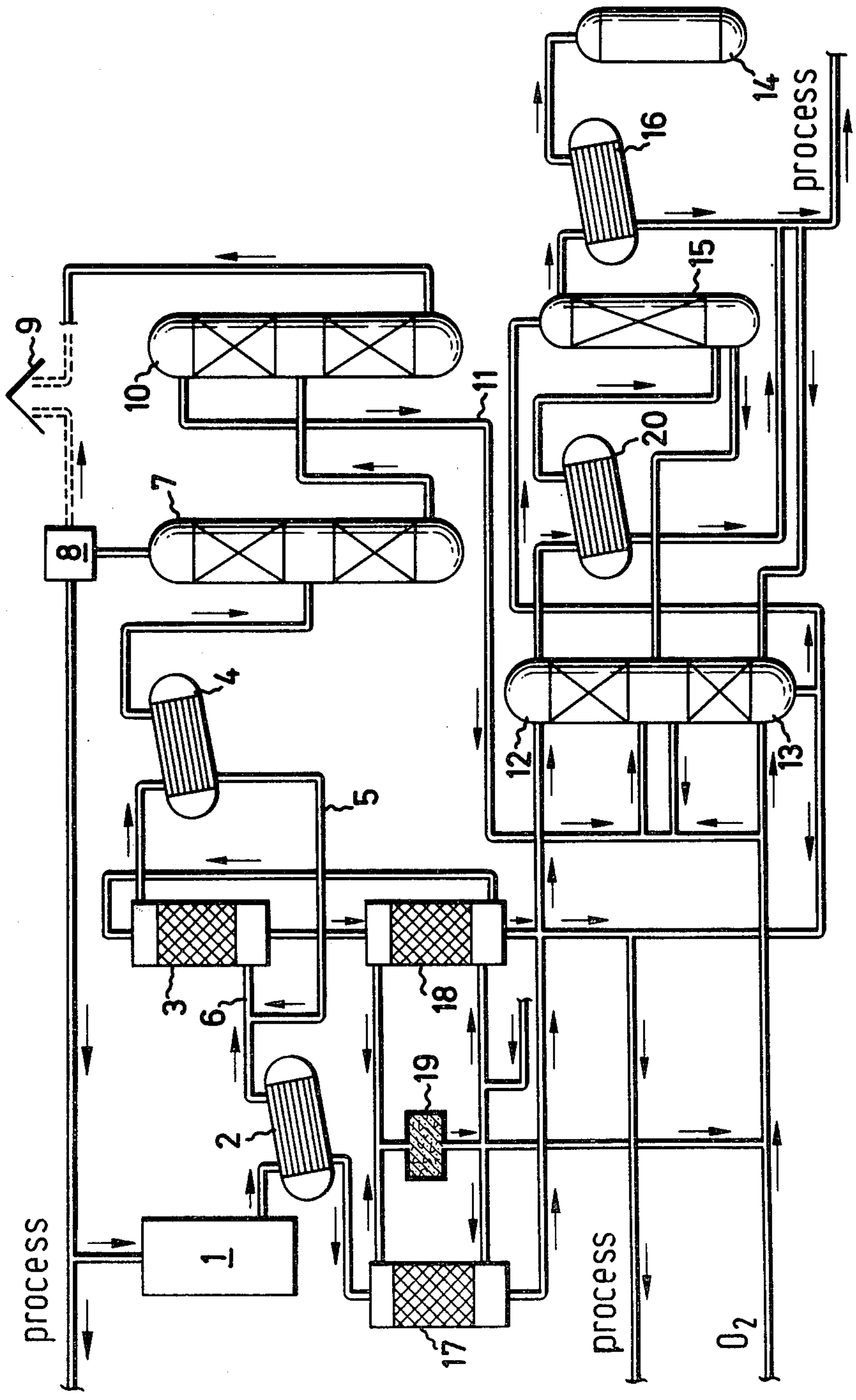
process
process
process
$O_2$
1
2
3
4
5
6
7
8
9
10
11
12
13
14
15
16
17
18
19
20

PROCESS FOR THE PURIFICATION OF GASES CONTAINING RADIOACTIVE SUBSTANCES

This is a continuation, of application Ser. No. 886,519, filed Mar. 14, 1978, now abandoned.

This invention relates to a process for purifying gases containing radioactive substances as obtained in the processing of spent fuel of nuclear reactors, expecially by dissolving the said nuclear fuel in nitric acid.

Besides other radioactive substances spent nuclear fuel contains radioactive iodine and radioactive krypton. For processing, the nuclear fuel is first comminuted and then dissolved in nitric acid. During dissolution of the nuclear fuel gases are formed containing, inter alia, radioactive krypton and radioactive iodine. The gases are substantially composed of steam, nitrogen, nitric oxide, higher nitrogen oxides, vaporous nitric acid, xenon, krypton, iodine and tritium.

The separation of radioactive substances from gas mixtures of the aforesaid type constitutes quite a problem in that these substances generate considerable amounts of heat which counteract a separation. When krypton is separated by distillation the generated amount of heat corresponds to about 40% of the heat of condensation which—independent of the chosen reflux ratio in a distilling column—prevents the liquid from flowing back to the lower plates.

It is the object of the present invention to separate krypton and iodine as quantitatively as possible from the gas mixture formed when dissolving the nuclear fuel and bring them to as small a volume as possible.

This problem is solved by a process which comprises (a) mixing the gases containing the radioactive substances with a carrier gas approximately having the same separation behavior as the radioactive substances, (b) separating the gas mixture obtained into a fraction containing the radioactive substances and the carrier gas and a fraction free from said components, and (c) separating the carrier gas from the radioactive substances.

The carrier gas can be separated from the radioactive substances by adsorption, for example by means of catalyst supports, for example kieselguhr. The dilution of the radio-active substances with the carrier gas makes possible a conventional separation. The carrier gas should have approximately the same separation behaviour as the radioactive substances. A suitable carrier gas for krypton is, for example, nitric oxide (NO) and for argon carbon monoxide. Prior to the separation from the radioactive substances it may prove advantageous to subject the carrier gas to a chemical treatment, for example with oxygen, whereby higher oxides are formed which can be separated by condensation, distillation or washing. When nitrogen oxides are to be separated water may be used and for separating $CO_2$ sodium hydroxide solution is a suitable agent. The gases containing the carrier gas can be separated by distillation into a fraction containing the radioactive substances and the carrier gas and a fraction free from these components and containing the remaining gases. The admixture of the carrier gas can be effected by disproportionation of higher nitrogen oxides—which are contained anyhow in these gases and originate from the dissolution of the nuclear fuel with nitric acid. On principle, the iodine can be separated after each process step. It proved especially advantageous to combine the separation of the iodine with the disproportionation. In this process the iodine is absorbed and the absorption liquid containing the iodine is subsequently subjected to a desorption. The desorbed iodine is then passes to a filtration by means of an entrainer gas, for example oxygen. The oxygen freed from iodine can advantageously be used again for the oxidation of the carrier gas. In this manner, traces of radioactive impurities, which may still be contained in the entrainer gas, are prevented from escaping into the atmosphere.

The invention will now be described by way of example with reference to the accompanying flow sheet.

Referring to the drawing, the gases formed in the dissolution stage (1), which also includes the mechanical comminution, and essentially composed of steam, nitrogen, nitric oxides, vaporous nitric acid, xenon, krypton, and iodine, are passed into condenser (2) in which the vapors are condensed and part of the $NO_2$ and the iodine are absorbed. From condensor (2) the gases are passed into absorption column (3) where they are washed with nitric acid. In this process nitric oxides are formed and simultaneously higher nitrogen oxides and iodine are absorbed. The gases leaving absorption column (3) are freed in condensor (4) from higher nitrogen oxides which are recycled via conduit (5) into the gas inlet (6) of absorption column (3). The gas leaving condensor (4) is optionally passed over an adsorber chain-not shown-and introduced into a separating column (7), where the gases are separated by distillation into two fractions. One fraction contains the radioactive substances together with the carrier gas and xenon; it is withdrawn at the bottom of the separating column. The other fraction, leaving the separating column (7) at the head, can be conducted through an adsorber (8) to retain traces of radioactive substances possibly contained therein. The fraction, mainly consisting of nitrogen, is eliminated through a chimney (9) and/or recycled as scavenging gas into dissolution stage (1). The sump product of separating column (7) can be introduced into a series-connected separating column (10) from which a mixture of radioactive substances and carrier gas is obtained as head product. This mixture is passed through conduit (11) and introduced at the bottom of part (12) of a two-stage chemical treatment. The xenon obtained in the sump of separating column (10) is rejected. In the chemical treatment the mixture is treated with oxygen and/or nitric acid whereby the nitric oxide is oxidized to higher nitrogen oxides. The nitrogen oxides are condensed in the series-connected condenser (16). If the radioactive substances still contain traces of nitrogen oxides, these may be separated in absorbers-not shown-following the condenser. The gaseous or liquid radioactive substances are introduced into a tank (14).

The nitric acid obtained in the two-stage chemical treatment can be recycled into dissolution stage (1) or any other suitable stage of the nuclear fuel or gas reprocessing. The nitrogen oxides obtained in condenser (16) can be re-used in the same manner.

In order that an ozone formation is avoided in the liquefaction of the radioactive substances the oxygen introduced into the chemical treatment must be consumed quantitatively. Simultaneously, the nitrogen oxides should be substantially transformed into nitric acid to the end that additional auxiliaries, for example hydrogen or ammonia, need not be introduced into the process, which would increase the amount of contaminated (polluted) substances. To satisfy these two requirements a column (15) for synproportionation of NO can be intercalated between the two-stage chemical treatment and condenser (16). It may be of advantage to intercalate, between part (12) and column (15) a condenser (20) to ensure a more substantial separation of nitrous gases (mixture of $NO_2$ and NO).

The nitric acid obtained in the sump of stage (13) of the chemical treatment is introduced at the head of column (15) and contacted in counter-current flow with the head product of stage (12) of the chemical treatment. The sump product of column (15) is introduced at the head of stage (13) and the stoichiometric amount of oxygen is introduced into the chemical treatment in such a manner that there is a deficiency thereof in stage (12) and an excess in stage (13).

The sump products of condenser (2) and adsorption column (3) are passed into desorbers (17) and (18) and the desorbed iodine is blown out with an entrainer gas. In a filtration (19) the entrainer gas is freed from iodine.

What is claimed is:

1. A process for purifying radioactive-substance-containing gases obtained in the processing of spent nuclear fuel, said gases comprising water vapor, nitrogen, nitric oxide, a higher nitrogen oxide, and vaporous nitric acid, which comprises (a) washing said radioactive-substance-containing gases with nitric acid, (b) separating the gas mixture obtained by the washing into a fraction containing radioactive substances and nitric oxide and a fraction free thereof, and (c) separating nitric oxide from the radioactive substances.

2. The process as defined in claim 1, wherein the nitric oxide is oxidized prior to its separation from the radioactive substances.

3. The process as defined in claim 2, wherein the oxidation products are separated from the radioactive substances by condensation.

4. The process as defined in claim 2, wherein the oxidation products are separated from the radioactive substances by distillation.

5. The process as defined in claim 2, wherein the oxidation products are separated from the radioactive substances by washing.

6. The process as claimed in claim 3, 4 or 5, wherein the oxidation products are transformed into nitric acid.

7. The process as defined in claim 1, wherein the gas mixture obtained by said washing is separated by distillation into a fraction containing the radioactive substances and nitric oxide and a fraction free thereof.

8. The process as defined in claim 1, wherein, prior to the separation of the radioactive substances, the nitric oxide is subjected to a chemical treatment to form a higher oxide of the nitric oxide.

* * * * *